March 19, 1929.  J. D. BENBOW ET AL  1,706,099
DUMP WAGON
Filed April 17, 1928   7 Sheets-Sheet 4
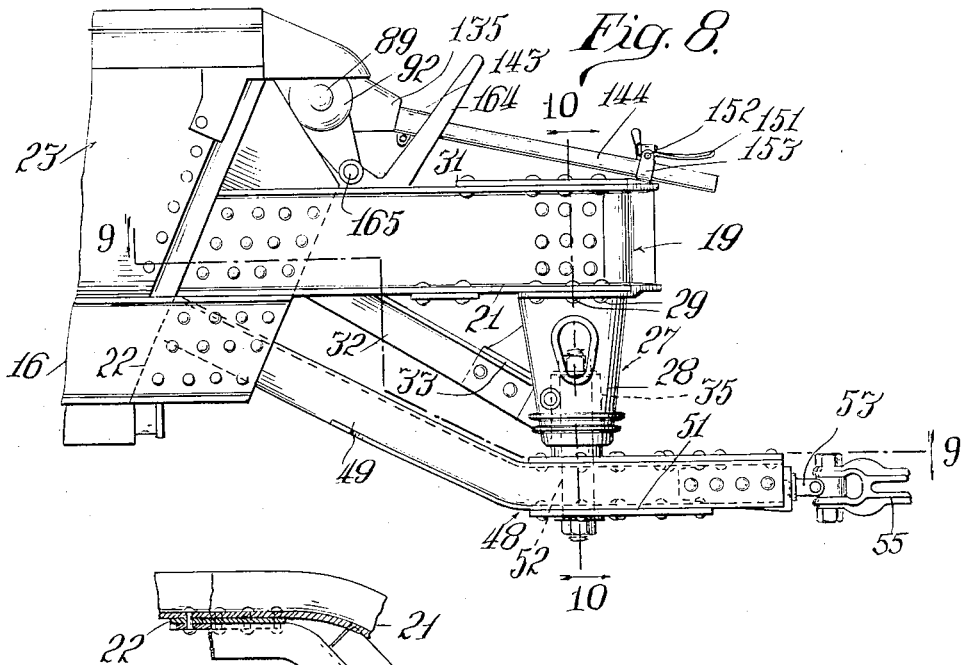
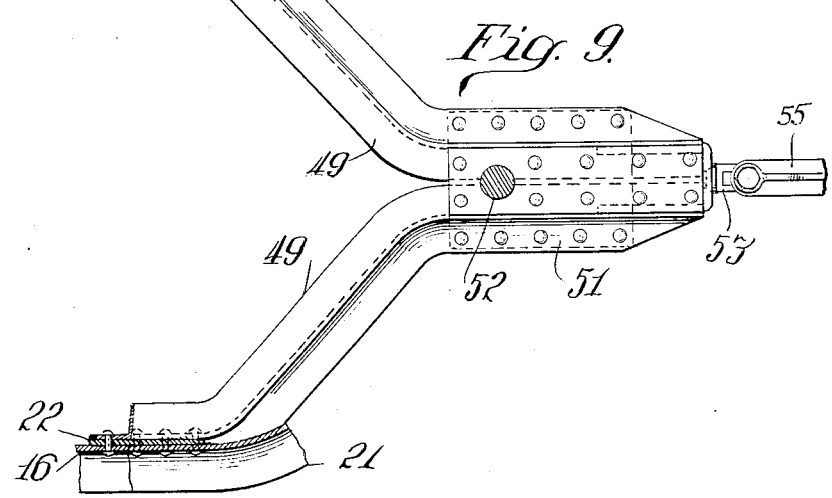
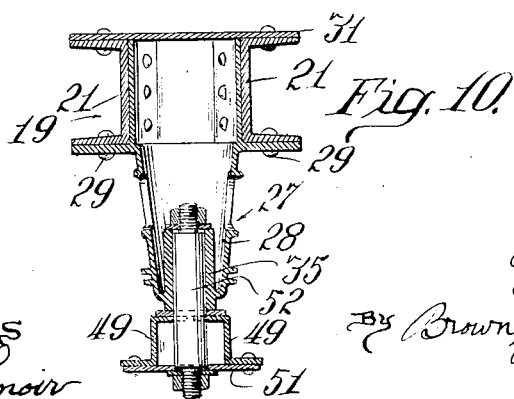
Inventors.
James D. Benbow
James B. Green
By Brown, Jackson, Boettcher & Dienner
Attorneys
Witness
Milton Lenoir

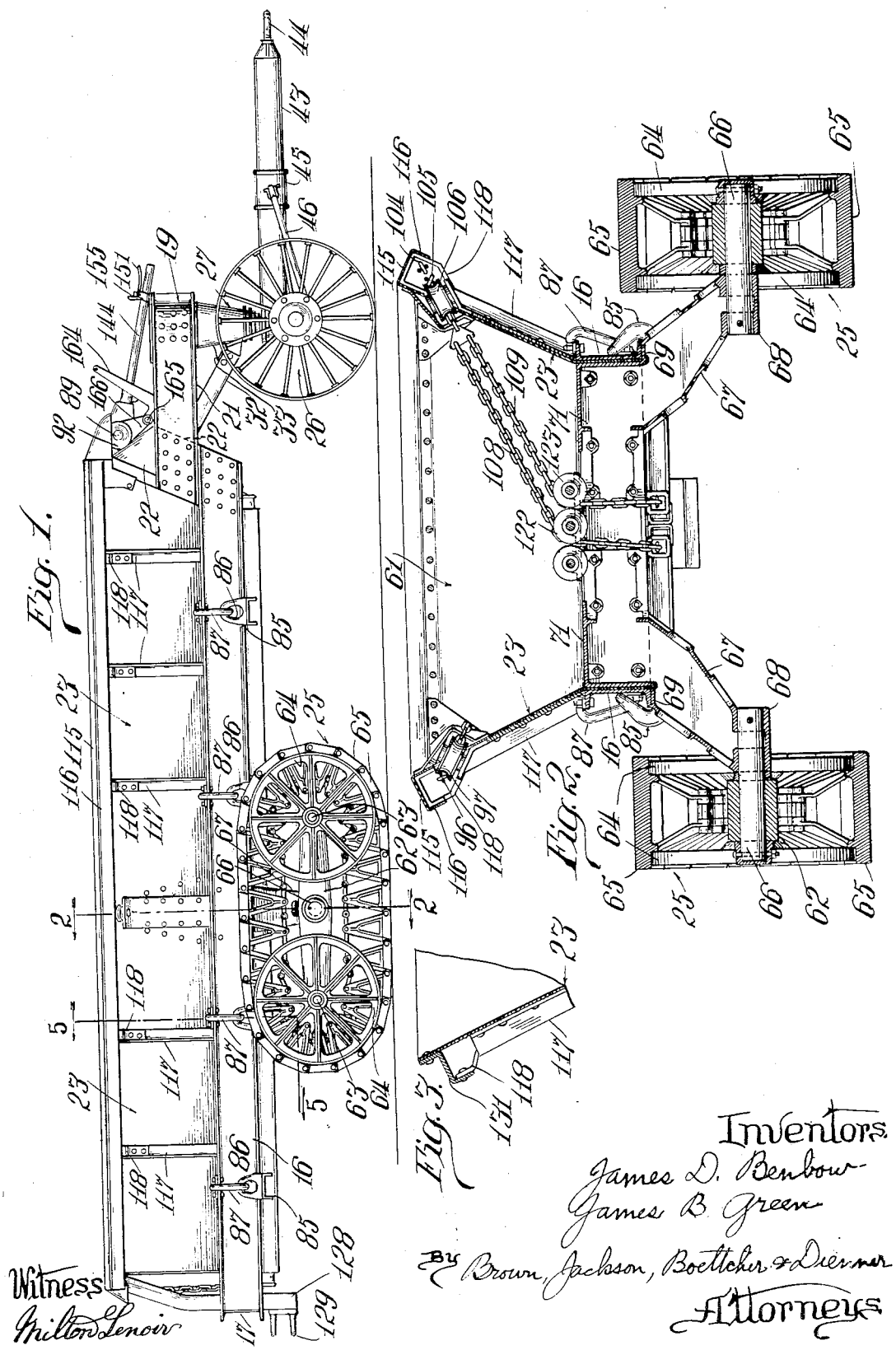

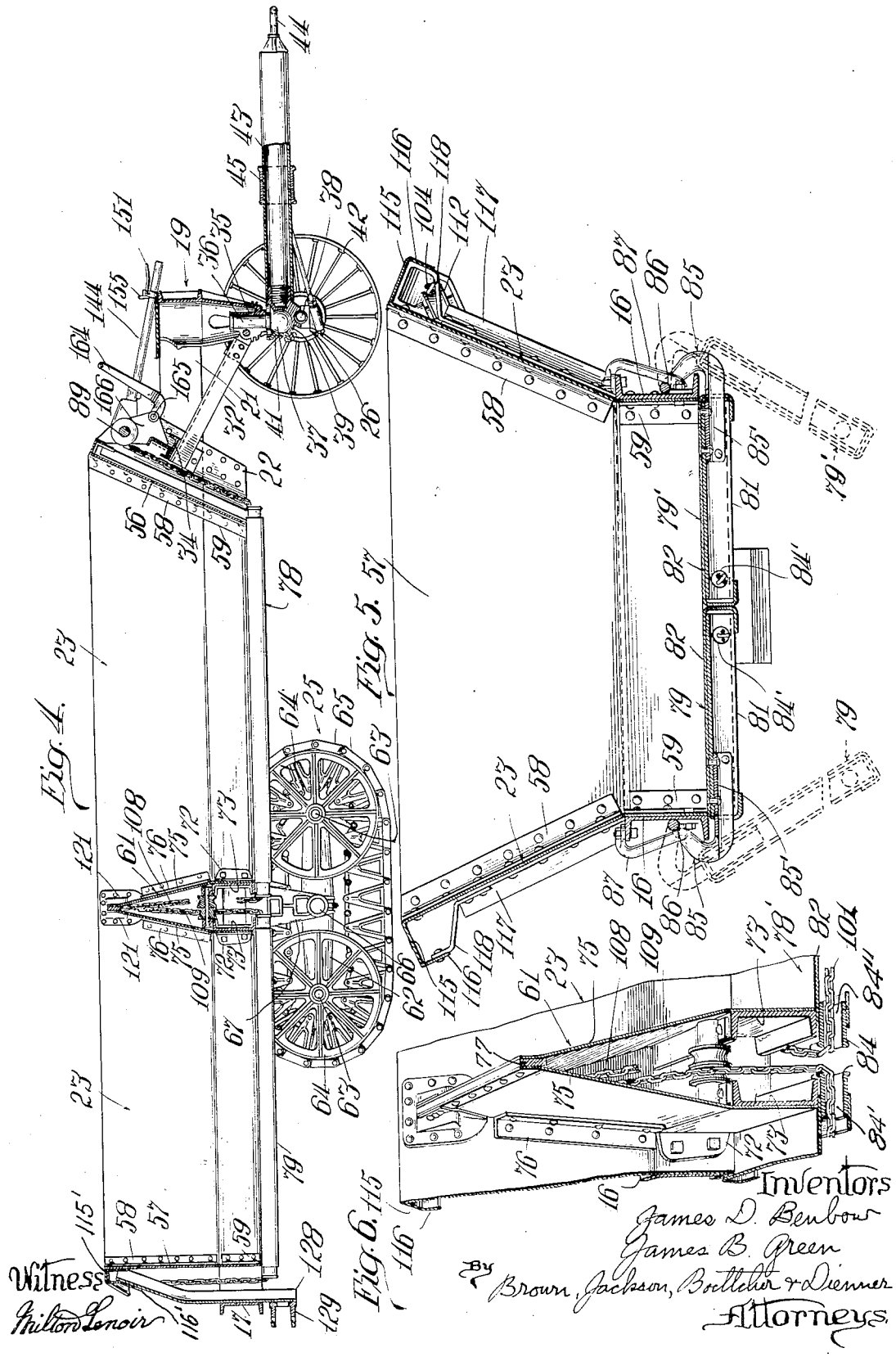

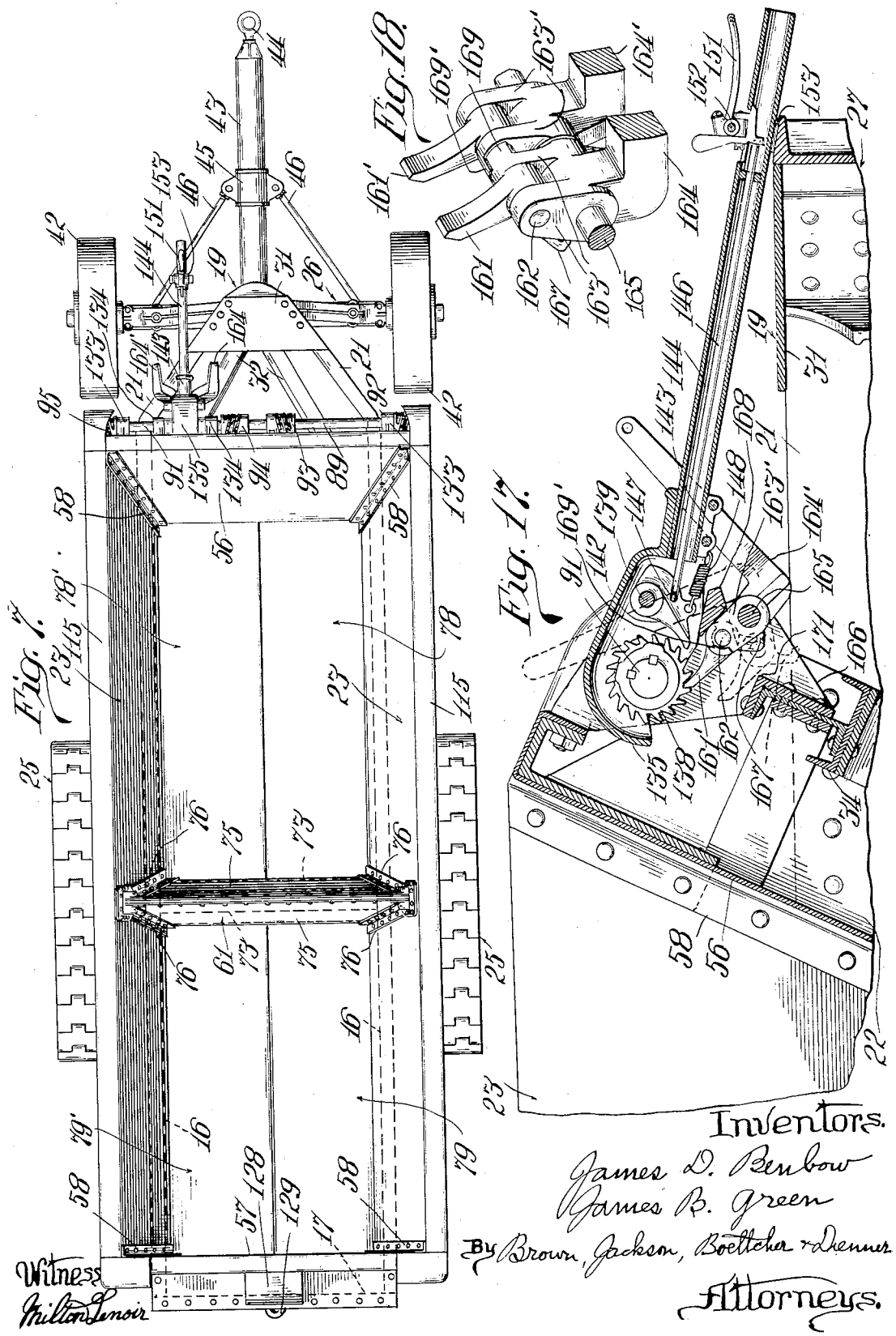

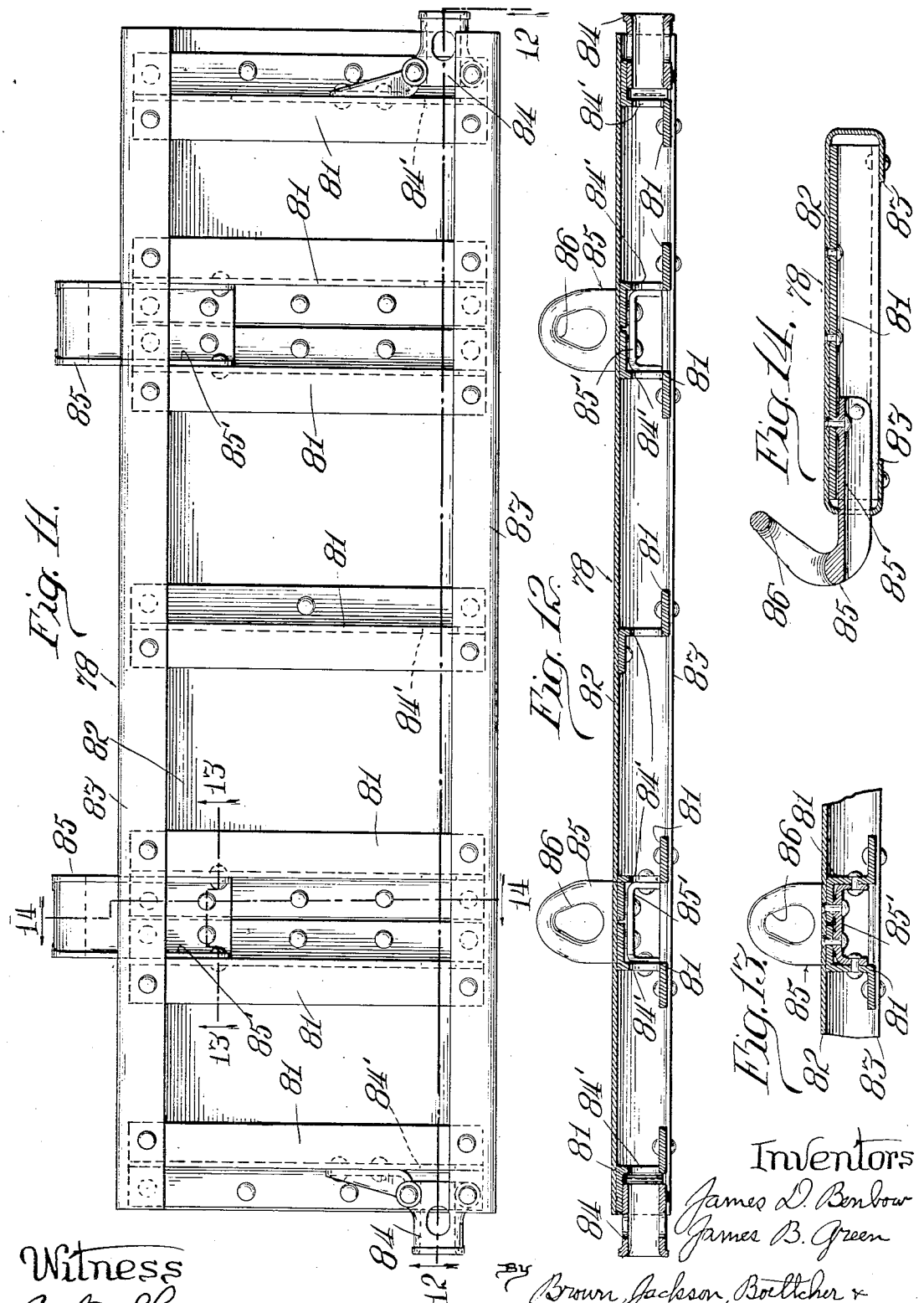

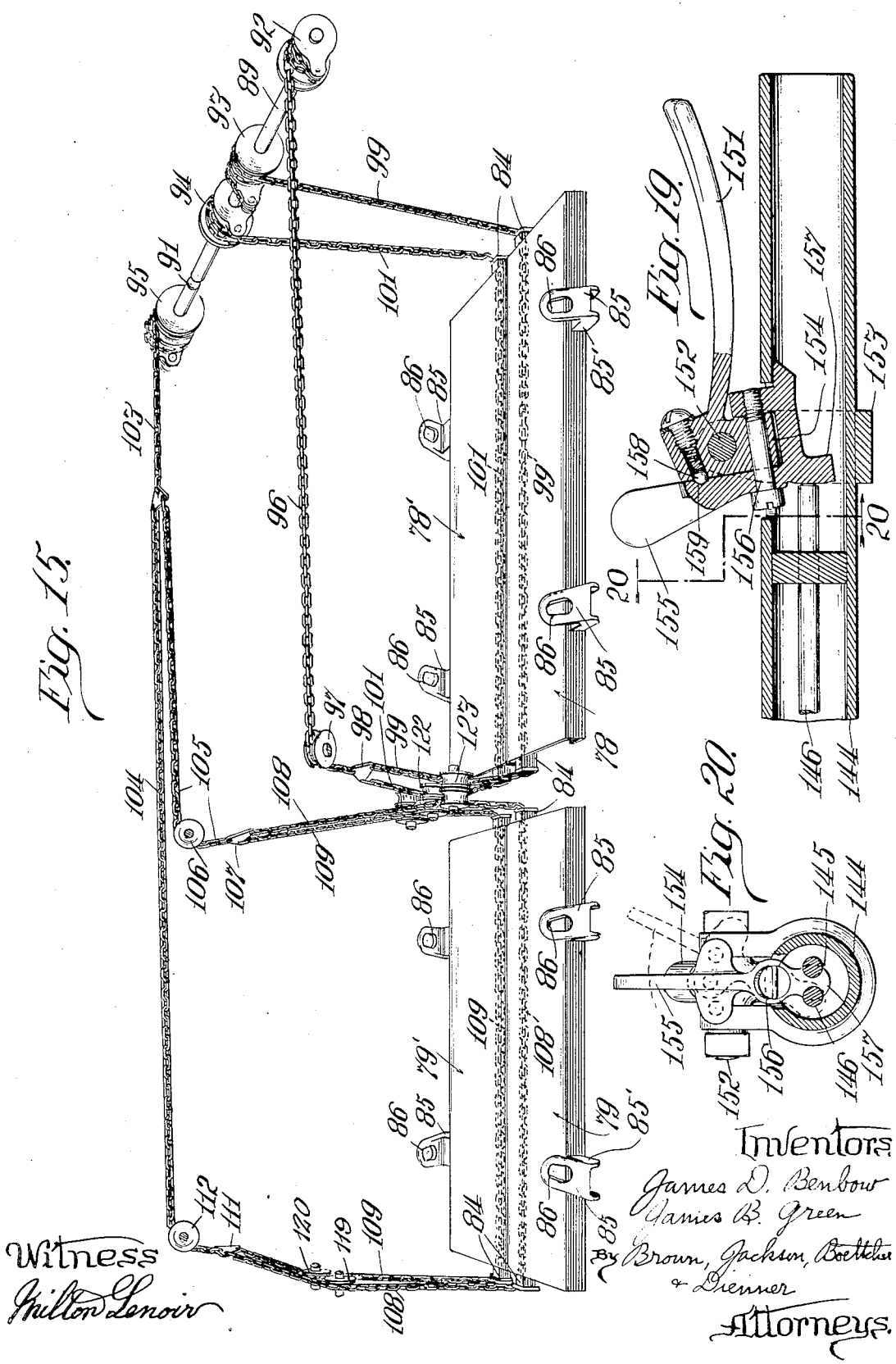

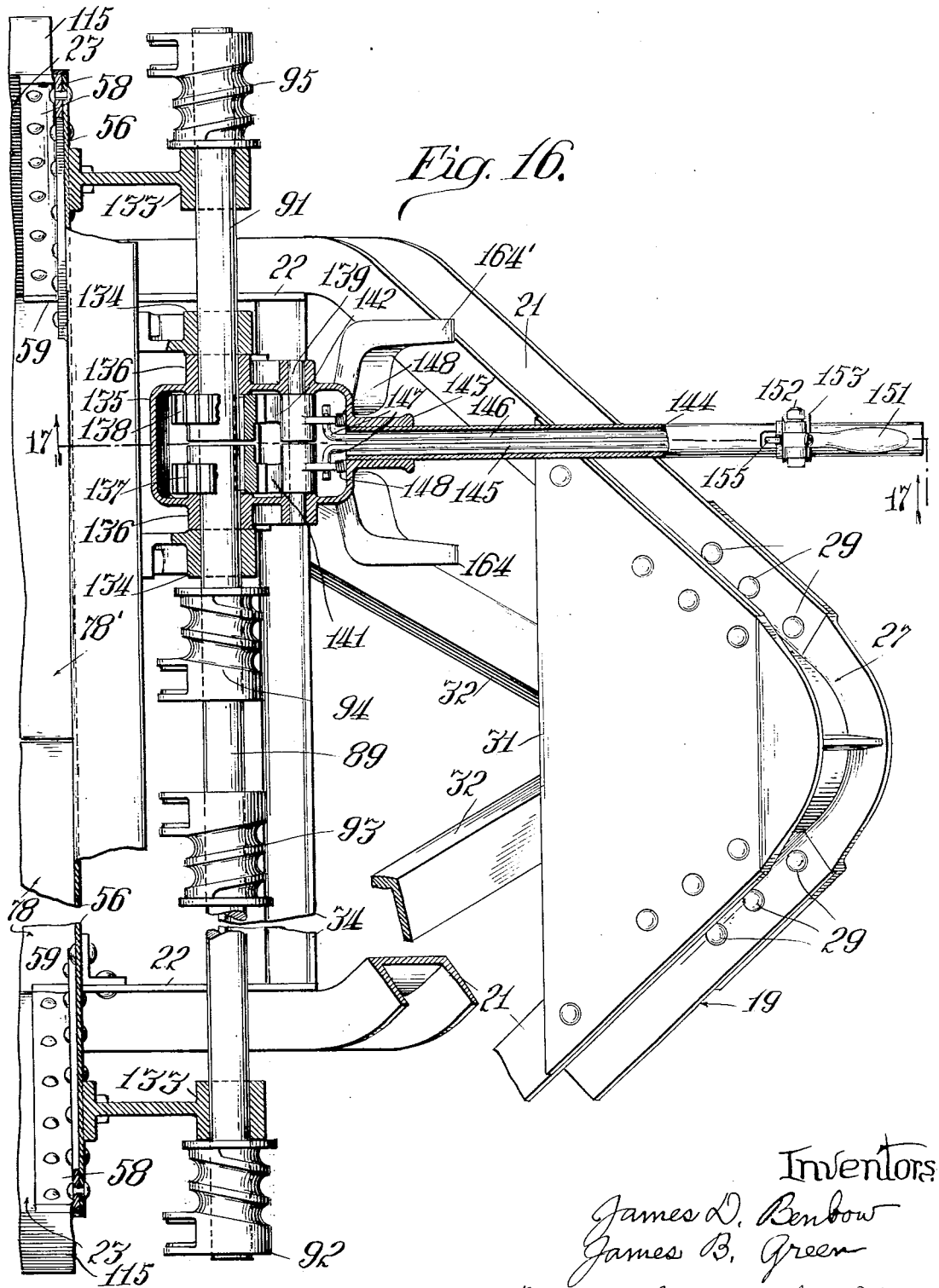

Patented Mar. 19, 1929.

1,706,099

UNITED STATES PATENT OFFICE.

JAMES D. BENBOW AND JAMES B. GREEN, OF AURORA, ILLINOIS, ASSIGNORS TO WESTERN WHEELED SCRAPER COMPANY, OF AURORA, ILLINOIS, A CORPORATION OF ILLINOIS.

DUMP WAGON.

Application filed April 17, 1928. Serial No. 270,645.

The present invention relates to dump wagons, having particular reference to such wagons of the bottom dump type, which employ one or more bottom doors or gates adapted to be swung down in the dumping operation.

One of the principal objects of the invention is to provide such a dump wagon which is supported on endless, self-laying tracks or treads, in lieu of the ordinary wheels. In attempting to adapt endless treads to a wagon characterized by bottom dumping, certain problems are encountered which are not present in the case of the ordinary wheeled wagon. Principal of these is the establishment of a transverse support between the two traction units at the sides of the wagon, corresponding to the through axle which exists in the wheeled wagon. The two tread units must be disposed intermediate the ends of the wagon, since they are intended to support practically all of the load. Obviously, it would be impracticable to extend a straight through axle between the opposite tread units because of the difficulty in dragging such axle through the pile of material after dumping. That is to say, approximately half the load will be dumped in front of the transverse plane of the tread units and the other half in rear thereof, and if any such through axle were employed it would be necessary to drag this axle through the pile of dumped material in clearing the wagon from the pile. The present invention avoids this difficulty by providing an improved frame construction which carries the sagging or spreading stresses between the said units, without the presence of a through axle, and without reducing the effective clearance below the wagon.

Another object of the invention is to provide an improved construction and arrangement of wheeled forecarriage for the front end of the wagon, together with an improved construction of pivot bracket therefor, whereby the forecarriage or truck can be readily removed in adapting the wagon to situations where the front end thereof is supported directly on the tractor or other vehicle pulling the wagon.

Another object is to provide an improved construction of dumping door, and an improved mounting thereof on the wagon, whereby the door can clear itself of the dumped pile of material.

Another object is to provide an improved arrangement and grouping of the chains for raising the several doors to closed position; and to provide an improved construction of winding mechanism capable of operation for raising all of the doors simultaneously, or for raising different doors selectively. This winding mechanism also comprises improved tripping means arranged whereby the rear pair of doors can be dropped independently of the front pair of doors, but the front pair of doors cannot be dropped independently of the rear pair of doors. This prevents the possibility of a load condition occurring which might tilt the wagon backwardly around the pivot axis of the endless tread units.

Still another object of the invention is to provide a dump wagon of the above description which will be simple and inexpensive to construct.

Other objects and advantages of the invention will appear in the following description of a preferred embodiment thereof. In the accompanying drawings, illustrating such embodiment:—

Fig. 1 is a side elevational view of the improved wagon;

Fig. 2 is a transverse sectional view, taken approximately on the plane of the line 2—2 of Fig. 1;

Fig. 3 is a fragmentary detail sectional view, illustrating a modified construction of bed;

Fig. 4 is a vertical longitudinal sectional view through the wagon;

Fig. 5 is a transverse sectional view, through the wagon, in the plane of two of the dumping doors;

Fig. 6 is a vertical sectional view in perspective through the reenforcing partition which divides the wagon bed into front and rear compartments;

Fig. 7 is a plan view of the entire wagon;

Fig. 8 is a side elevational view of the front end of the wagon, illustrating the front truck or forecarriage removed and the hitch connection altered for supporting the front end of the wagon directly on the tractor or other pulling vehicle;

Fig. 9 is a horizontal sectional view of this front draft connection, taken approximately on the plane of the line 9—9 of Fig. 8;

Fig. 10 is a vertical sectional view, taken on the plane of the line 10—10 of Fig. 8;

Fig. 11 is an inverted plan view of one of the dump doors;

Fig. 12 is a longitudinal sectional view through the door, taken on the plane of the line 12—12 of Fig. 11;

Fig. 13 is a fragmentary sectional view taken on the plane of the line 13—13 of Fig. 11;

Fig. 14 is a transverse sectional view through the door on the plane of the line 14—14 of Fig. 11;

Fig. 15 is a diagrammatic perspective view, illustrating the paths of the chains associated with the several dump doors;

Fig. 16 is a sectional plan view of the winding mechanism at the front end of the wagon;

Fig. 17 is a sectional view transversely through the winding mechanism, taken approximately on the plane of the line 17—17 of Fig. 16;

Fig. 18 is a fragmentary perspective view of the two tripping pawls of the winding mechanism;

Fig. 19 is an enlarged longitudinal sectional view through the front end of the winding handle; and Fig. 20 is a transverse sectional view, taken on the plane of the line 20—20 of Fig. 19.

The frame of the wagon comprises two longitudinal beams 16, constituting the side sills of the wagon bed, such beams preferably being of channel cross-section. The rear ends thereof are joined by a transverse channel beam 17 which is suitably secured to the longitudinal beams 16 by gusset plates riveted to the adjoining ends of the three beams.

The front ends of the side beams 16 are secured to an elevated frame extension 19 comprising two channel bars 21 projecting forwardly from and above the ends of the side beams 16. Plates 22 extend upwardly along the inner sides of the overlapping ends of the channels 16 and 21, and are riveted to both channels for joining the same together. The bed of the wagon is of hopper shape having sloping side walls, and comprises plates 23 which are secured to the frame structure in a manner to be presently described.

The self-laying track or endless tread units are indicated at 25, it being noted that these units are disposed approximately midway between the ends of the load carrying bed so that the treads carry practically all of the load.

In most instances, the front end of the wagon will be supported on a wheeled truck 26, although the construction is such that this wheeled truck can be easily removed so that the front end of the wagon may be mounted directly on the tractor or other pulling vehicle. Referring to the construction by which this is made possible, it will be seen from Figs. 7, 8 and 9 that the converging front ends of the channel bars 21 are secured to the sides of a vertical pivot bracket 27 extending downwardly from the frame extension 19. The bracket comprises a hollow tapering portion 28 having lateral flanges 29 projecting therefrom, on which the lower flanges of the channel bars 21 rest and to which they are secured.

A triangular plate 31 extends across the upper sides of the channel bars 21 and is riveted to the upper flanges thereof. Two inclined brace bars 32 have their lower ends secured to step-like extensions 33 projecting rearwardly from the bracket 27. Referring to Fig. 16, these brace bars diverge laterally and have their upper ends secured to a transverse channel bar 34 (Figs. 4 and 17) extending between the two side plates 22. Referring to Fig. 10, a cylindrical bearing socket 35 is formed integral with the bracket 27 and extends upwardly into the hollow portion 28 thereof. When the wheeled truck 26 is to be employed, a king-pin 36 is placed in the bearing socket 35, this king-pin comprising a cylindrical upper shank portion and a ball end 37, as shown in Fig. 4.

A shoulder at the lower end of the shank portion bears against the lower end of the bearing socket 35, and the shank portion and ball end are hollow for the introduction of a lubricant which can pass outwardly through holes in the shank portion and in the ball end to the bearing surfaces contacting with these portions. The transverse axle 38 of the truck is provided with a spherical socket 39 in which the spherical end 37 of the king-pin seats. The assembly of the socket over the ball end is permitted by a removable ball retaining cap 41 which is bolted to the open rear side of the socket after the ball has been mounted therein. The wheels 42 are mounted on spindles projecting from the ends of the axle 38. A draft tongue 43 is rigidly secured to said axle and has a coupling eye 44 at its front end adapted for establishing a coupling hitch with the tractor.

A collar 45 secured to the draft tongue 43 has brace rods 46 extending diagonally rearwardly therefrom, such brace rods being secured to the spindle ends of the axle and bracing the connection between the axle and the draft tongue. It will be seen that the ball and socket joint established between the frame of the wagon and the wheeled truck 26 affords a fifth wheel around which the truck can swing to steer the wagon, and also permits lateral rocking of the truck in passing over uneven ground, and permits vertical tilting of the draft tongue 43 in relative fore and aft tilting movement between the tractor and the wagon.

When it is desired to support the front end of the wagon directly on the tractor, the wheeled truck 26 is removed by simply withdrawing the king-pin 36 from the bearing socket 35. Thereupon, a hitch member, such as is shown in Figs. 8, 9 and 10, is substituted for the truck. This hitch member, designated 48 in its entirety, comprises two bars 49, preferably of Z-bar section, having their parallel front ends joined together by plates or any other suitable form of bracket structure 51. The rear portions of the bars 49 are bent upwardly and are separated laterally for attachment to the inner sides of the frame bars 16, as shown in Fig. 9. The outwardly projecting flanges of these Z-bars terminate short of the rear ends of the bars so that the vertical webs thereof can be secured to the frame bars of the wagon.

The bracket structure 51 carries a pin 52 extending upwardly into the bearing socket 35 and held therein by nuts screwing over a reduced upper end of the pin and engaging with the upper end of the bearing socket. A draft coupling 53 extends forwardly from the front end of the hitch member 48 for establishing pivot coupling with the tractor and for supporting the weight of the front portion of the wagon on the tractor. The tractor draw bar is indicated at 55.

Referring again to the construction of the bed, it will be observed from Fig. 5 that the outwardly sloping side walls 23 have their lower portions bent vertically and extended down along the inner sides of the longitudinal channels 16, these downwardly extending portions of the plates 23 being bolted or riveted to the channels.

As shown in Fig. 4, the front end of the load carrying body is formed by a sloping plate 56, and the rear end thereof by a vertical plate 57. The side and end walls of the bed are joined by upper and lower series of angle bars 58 and 59 which are riveted in the corners of the bed. Intermediate the ends of the bed is a transverse partition or dividing wall 61, which separates the interior of the bed into front and rear compartments. The structure which supports the two endless tread units 25 is built into this transverse partition.

Each endless tread unit comprises a rocker beam 62 in the ends of which are mounted axle shafts 63 supporting wheels 64 on opposite sides of the beam. The series of inter-connected links 65 pass over these wheels 64. The construction shown is of the type commonly known as the "Athey" tread, wherein the tread plates are trussed, with the inner ends of the truss members linked together, but it will be understood that such construction is merely exemplary and that any other type of endless tread may be used. The rocker beam of the tread unit is pivotally supported on a stub axle 66 which is mounted in an axle bracket 67 joined to the frame within the transverse partition 61. Referring to Fig. 2, it will be observed that the bracket 67 comprises an outwardly and downwardly inclined arm, which is preferably hollow and suitably reenforced, and which carries a hub 68 at its lower end in which the stub shaft or axle 66 is mounted. A shoulder 69 at the upper portion of this arm bears against the lower flange of the adjacent frame channel 16, and is bolted or otherwise secured thereto.

The upper end of each bracket 67 is formed with a horizontally extending box-like portion 71 having at its outer end laterally projecting attaching flanges 72 (Fig. 6) which are bolted or riveted to the inner side of the adjacent frame channel 16. As shown in said latter figure, two channel bars 73 extend transversely from side to side of the frame and have their flanges facing inwardly towards each other for embracing the upper and lower sides of the box-like portions 71 of both brackets.

Said channel bars 73 are bolted to the latter portions of the brackets, thereby providing, in effect, a heavy strut extending between the brackets and sustaining the sagging or spreading stresses set up between the two axle brackets. As shown in Fig. 2, the inner ends of the two box-like portions 71 are separated to provide a passageway down between the two channel bars 73, 73, through which passageway certain of the hoisting chains can pass to the dumping doors, as will be presently described. Plates 75 are secured to the outer sides of the channel bars 73 and extend upwardly approximately to the top of the body, where they are converged together and secured to the opposite sides of a bar 77 extending transversely between the side walls 23, 23. Angle bars 76 are secured to the plates 75 and to the side plates 23 to secure all of these plates together.

The bottom of the compartment defined in front of the partition 61 is closed by two doors 78, 78', and the bottom of the compartment defined in rear of the partition 61 is closed by two similar doors 79, 79'.

Referring to Figs. 11 to 14, inclusive, each door comprises a plurality of bars 81, preferably of Z-shaped cross section, located at longitudinally spaced points along the length of the door. A sheet metal plate 82 is secured to the upper flanges of these bars and has its lateral edges bent downwardly across the ends of the bars and under the same, as indicated at 83, such downwardly bent portions of the plate constituting the lateral edges of the door.

The upper flanges of the Z bars afford attaching surfaces to which the top portion of the plate 82 can be riveted at closely spaced intervals. The lower flanges of the Z bars also afford attaching surfaces to which the inwardly bent lower edges 83 of the plate can be secured. The two bars at the ends of the door have tubular guide brackets 84 secured thereto adjacent to the swinging edge of the door, through which brackets passes the section of hoisting chain which raises the door, as we shall later describe. The intermediate Z bars have openings 84' provided in the vertical webs thereof in alignment with the guide brackets 84, to form a continuous passageway through the door for the chain. It will be noted that the downwardly and inwardly bent flange portion 83 at the swinging edge of the door substantially embraces the hoisting chain around the edge and under side of the door, thereby affording a protective boxing or guideway for the chain and preventing the entrance of dirt to the chain if this edge of the door should drag in the dirt in the dumping operation.

Secured to the outer edge of each door at longitudinally spaced points along its length are hinge brackets 85. The lower horizontal portions of these brackets extend through openings cut in the outer downwardly turned marginal portion 83, and are rigidly secured to the reenforcing bars 81 of the door.

At the points where the hinge brackets enter the door, the Z bars are grouped in pairs, with the upper flanges of each pair disposed substantially edge to edge, thereby defining a channel-shaped socket for receiving the inner end of the hinge bracket. The attaching portion 85' of the latter is also of channel-shaped section, the side flanges thereof being riveted to the webs of the Z bars, and the web thereof being riveted through the top flanges of the Z bars and through the plate 82. Thus, each hinge bracket has a staunch, durable attachment to the door. The outer portion of each hinge bracket is inclined upwardly and inwardly and is apertured to provide a hinge eye 86, as best shown in Fig. 1. Each eye 86 engages around a bracket 87 having its lower end secured to the web of the side channel 16 and having its upper end inclined around the top flange of said channel and secured to the upper surface thereof. It will be evident that the foregoing hinge connection permits of a certain amount of play of the door relatively to the body. As shown in dotted lines in Fig. 5, the doors in their dumped position will tend to hang with their lower edges disposed under the frame, but the doors are free to swing outwardly beyond the sides of the frame in clearing themselves of the dumped pile. Moreover, the mounting of the eyes 86 on the brackets 87 permits the doors to move upwardly and downwardly, when in their dumped position, so that they can clear themselves from the dumped pile and other obstructions as the wagon is being drawn away after dumping. In their closed position, the doors are disposed substantially flush with the lower edges of the sill channels 16, and, as shown in Fig. 4, the inner ends of both pairs of doors terminate substantially flush with the sides of the axle brackets 67 so that they clear these brackets in swinging down to dumping position.

The explanation of the paths taken by the chains for raising the dump doors will be facilitated by referring first to the diagrammatic illustration of such chains in Fig. 15. The winding mechanism, to be hereinafter described, is located at the front end of the wagon and comprises two co-axial shafts 89 and 91. Mounted on the shaft 89 are three helically grooved winding drums 92, 93 and 94, and mounted on the other shaft 91 is a similar winding drum 95. Connected to and winding about the drum 92 is a chain 96 which extends along one side of the wagon and passes downwardly around a pulley 97 disposed intermediate the ends of the wagon. To the end of the chain 96 is connected an equalizing bar 98, to the ends of which, in turn, are connected two chains 99 and 101. The latter chains extend downwardly to the free, inner edges of the two doors 78, 78', and pass forwardly through openings in their respective doors. Passing outwardly from the front edges of the doors, these chains extend upwardly to the two winding drums 93 and 94. It will be evident that in a winding rotation of the three drums 92, 93 and 94, the opposite ends of the two chains 99 and 101 will be drawn upwardly, thereby raising both doors 78 and 78' to closed position. The equalizing bar or link 98 compensates for any inequality in the lengths of the two chains and results in both doors being raised under equal forces.

Connected to and winding about the other drum 95 is a chain 103 which extends rearwardly along the other side of the wagon. This chain is linked to two chains 104 and 105, the first of which extends back to the rear end of the wagon and the second of which passes downwardly around a pulley 106 disposed intermediate the ends of the wagon. The end of the latter chain is connected to an equalizing link or bar 107, the two arms of which are in turn connected to two chains 108 and 109. Such chains extend down to the front edges of the two rear doors 79, 79' and extend through passageways in said doors back to the rear edges thereof, where they extend upwardly to an equalizing bar 111. The chain 104, which extends back to the rear end of the vehicle, passes downwardly around a pulley 112 and is connected to the equalizing bar 111. It will be evident that winding rotation of the drum 95 will draw forwardly on the two chains 104, 105, thereby pulling upwardly on opposite ends of the two hoisting chains 108 and 109 and raising the doors 79, 79' to closed position. The interposition of the equalizing bars 107 and 111 between the ends of the latter chains and the ends of the pulling or winding chains 104, 105 result in equal lifting forces being transmitted to both doors.

Where the chains extend back along the sides of the wagon, they are housed over on the top to prevent the possibility of the chains being struck by the loading shovel or having material dropped thereon.

In the construction shown in Figs. 2 and 5, the upper margins of the side plates 23 are bent outwardly to form the top flange 115 and are then bent downwardly to form the outer flange 116. These flanges reenforce the upper edges of the side plates 23 and also form protecting enclosures or channels in which are disposed the longitudinally extending portions of the chains. Referring to Fig. 1, it will be seen that the outer sides of the plates 23 are reenforced by spaced upwardly extending angle bars 117, the lower ends of which terminate substantially flush with the top flange of the adjacent frame channel 16, and the upper ends of which terminate short of the channel defined by the flanges 115, 116. Straps or bars 118 have their lower ends secured to the angle bars 117 and extend diagonally outwardly and upwardly for attachment at their upper ends to the flange 116. Such straps provide a plurality of supports at spaced points along the under side of the inverted channel 115, 116, and prevent the chains from dropping down out of the channel.

Referring to Fig. 2, it will be seen that the two intermediate sheaves or pulleys 97 and 106 are disposed in openings cut in the side plates 23, being supported in suitable brackets disposed at an angle so as to direct the chains 96 and 105 inwardly and down into the hollow partition 61. The openings in the side plates 23, in which these pulleys are disposed, are covered by bulged plates 121 which prevent the entrance of dirt down into the interior of the partition 61.

Fig. 2 shows the two hoisting chains 108 and 109 extending downwardly between the side walls 75, 75 of such partition and passing down around two pulleys 122 and 123. The pivot axes of such pulleys are supported in brackets mounted on the upper edges of the transverse channels 73, 73, as shown in section in Fig. 4. The chains 108, 109 pass downwardly from these pulleys through the space intervening between the inner ends of the box-like bracket portions 70 71 and then extend rearwardly through passageways 84' provided in the two rear doors 79, 79'. To avoid obscuring the illustration, the chains 99 and 101 for the front pair of doors have not been shown, but it will be understood that these two chains also pass down around pulleys, corresponding to the pulleys 122—123, but disposed slightly forwardly thereof, and extend down between the bracket portions 71 and thence forwardly through passageways 84 (Fig. 6) in the front pair of doors 78, 78'. It will thus be seen that the hollow partition or dividing wall 61 serves the two-fold purpose of a transverse strut, reenforcing the intermediate portion of the wagon against sagging or spreading stresses in the transverse plane of the tread units 25, and also serves as a housing or enclosure through which the hoisting chains can be extended to the inner ends of both pairs of doors.

As previously described, the chain 104 extends to the rear end of the wagon and passes downwardly around a pulley 112.

As shown in Fig. 5, such pulley is suitably supported in a bracket mounted at the rear corner of the bed within the channel guide 115—116. The rear ends of the two hoisting chains 108, 109, which connect to this chain 104, pass down around pulleys 119, 120 (Fig. 15) similar to the pulleys 122, 123, which are suitably supported at the rear end of the frame, the two hoisting chains thence passing forwardly through the dumping doors 79, 79' as previously described. As shown in Fig. 4, the rear frame channel 17 is spaced from the end wall 57 of the bed, such channel thus protecting the aforesaid chains against injury if the wagon should be backed up against an obstruction. A rear hitch connection is also provided at this point, in the form of a vertical channel bar which is riveted to the inner side of the frame bar 17 and extends downwardly below the latter to support a hitch bracket 129. The upper end of the vertical channel 128 is bent forwardly for attachment within the flanged upper edge 115', 116' of the rear plate 57.

Instead of flanging the upper edges of the side plates 23, to form the inverted channel section 115, 116, the construction shown in Fig. 3 may be employed. In such embodiment, a bar 131, of approximately Z-shaped section, is extended along the upper edge of each side plate, the upwardly extending flange of said bar being riveted to the plate. It will be evident that such bar will reenforce the edge of the side wall 23, and the downwardly extending flange of the bar will form a channel guide through which the chains can be extended.

The diagonal straps 118 are also employed in this construction to prevent the chains from dropping down out of the channel guide.

Referring now to the construction of the winding mechanism, as shown in Figs. 16, 17, 18 etc., it will be seen that the two shafts 89 and 91 have bearing support in two outer bearing brackets 133 which are suitably secured to the front wall of the bed. The proximate ends of said shafts also have bearing support in brackets 134, between which is disposed a housing 135, the shaft ends entering this housing through bearing bosses 136, the latter affording a rotatable support of the housing 135 on the shafts. Keyed to the ends of the respective shafts within the housing 135 are ratchet wheels 137 and 138. The forwardly extending portion of the housing supports a transverse pivot shaft 139 on which two independently acting pawls 141 and 142 are mounted. The front portion of the housing 135 is formed with a split clamping extension 143 in which is secured a tubular operating lever or handle 144. Passing forwardly through such handle are two control rods 145 and 146 which have their rear ends bent laterally for effecting pivotal connection with lugs projecting from the pawls 141, 142, as indicated at 147. As shown in Fig. 17, a tension spring 148 is connected to the lower portion of each pawl, these springs normally tending to withdraw the two pawls from the teeth of their respective ratchet wheels 137 and 138.

Rearward thrusting movement of the rods 145, 146 is effected to swing the pawls into the teeth of their ratchet wheels in opposition to the action of the springs 148. It will be evident that with the pawls thus engaged in the ratchet wheels, vertical oscillation of the operating handle 144 is effective to transmit winding rotation to the two shafts 89 and 91.

Both control rods may be thrust rearwardly in unison, or one control rod may be thus actuated independently of the other through the operation of selecting mechanism at the front end of the handle 144. Thrusting movement is imparted to the rods through a lever 151 which is adapted to be squeezed toward the handle 144 in the act of gripping the end of the handle. Said lever is rotatably supported on a pivot pin 152 which is supported in a bracket 153 encircling the handle 144, the lever 151 being supported between spaced pivot portions of said bracket. The lever comprises a block 154 having a flat rear face on which is pivotally supported a selector member 155. Such member has transverse swinging movement across the face of the block about a pivot screw 156 extending through the member and into the block. The lower portion of the selector member 155 extends down into the tubular handle 144 and comprises a pallet-shaped portion 157 which is adapted to occupy any one of the different positions indicated in Fig. 20. In its intermediate position such extension is effective to transmit movement to the ends of both control rods 145 and 146; and by moving the selector member to one side or the other such extension is placed in position to transmit movement to one of the rods without transmitting movement to the other.

The selector member is yieldingly held in each of these three positions by a spring pressed ball 158, mounted in a recess in the block 154. Said ball has detent engagement in depressions formed in the face of a segment member 159 carried by the upper finger portion of the selector member. It will be apparent that, in squeezing the lever 151 toward the handle, the selector member will oscillate correspondingly and will transmit movement to either or both control rods 145, 146, depending upon the position in which the selector member is placed with reference to the lever 151. Hence, by appropriately placing the selector member in one position or the other the winding mechanism is made effective to raise both pairs of doors simultaneously with the stroking of the handle 144, or to first raise one pair of doors, and by then shifting the selector member, to raise the other pair of doors.

The two ratchet wheels 137 and 138 are normally held against retrograde movement by two locking pawls 161, 161', engaging respectively in the teeth of their associated ratchet wheels, below the operating or advancing pawls 141, 142. The two locking pawls are mounted on pivots 162 and supported by the relatively short arms 163, 163' of two bell crank levers 164, 164'. Such bell crank levers are pivotally supported on a fixed shaft 165, extending between the side portions of a stationary bracket structure, 166, which is disposed adjacent to the rotatable housing 135.

Each of these locking or detent pawls has a stop projection 167, adapted to engage the under side of its associated lever 164, 164', for limiting rotation of the pawl in a counter-clockwise direction about its pivot 162. The weight of the long outer arm of each tripping lever 164, 164', normally tends to hold said lever in the position indicated in full lines in Fig. 17, with the end of the short lever arm engaging a fixed stop 168, carried by the bracket structure 166. With each tripping lever in this position, the reactive thrust of the associated ratchet wheel against the detent pawl 161 or 161' acts along a line which tends to hold the lever arm 163 or 163' pressed against the stop 168, that is to say, the lever arm and each detent pawl have the relation of two toggle links tending to force the pivot 162 upwardly or forwardly. To release each detent pawl, it is only necessary to break this toggle in a downward direction, such being accomplished by swinging the long arm of the associated tripping lever 164, 164' in a rearward direction.

The tripping lever 164 is effective to drop the two front doors, through its release of the ratchet wheel 137 and winding shaft 89. The other tripping lever 164' is effective to drop the rear pair of doors, through its release of the other ratchet wheel 138 and associated winding shaft 91. The latter tripping lever is actuatable at any time independently of the first mentioned lever for dropping the rear pair of doors. This will result in the dumping of the load in the rear compartment of the wagon without dumping the load in the front compartment, the weight of this latter portion of the load being forward of the transverse pivot axis of the endless tread units 25 and hence maintaining the stability of the wagon.

Provision is made, however, for preventing the front pair of doors from being dropped independently of the rear pair of doors, as it will be evident that the dumping of the load in the front compartment, without dumping the load in the rear compartment, might result in this latter load tipping the front end of the wagon upwardly around the transverse pivot axis of the tread units. Referring to Fig. 18, it will be seen that the short arm of the lever 164 has a segment-shaped projection 169 on the inner side thereof, and the short arm of the outer tripping lever 164' has a similarly shaped projection 169' on its inner side and in the path of the companion projection 169. The projection 169' is disposed in rear or below the projection 169, so that its tripping lever 164' can be rocked backwardly and downwardly for dumping the rear doors without compelling corresponding movement of the other tripping lever 164. When this latter lever is operated, however, for dumping the front pair of doors, the stop projection 169 engages the companion stop projection 169', thereby compelling concurrent movement of the other tripping lever 164' for releasing both pairs of doors. Thus, in any selective dumping operation, there is no possibility of dumping the load from the front portion of the bed without also dumping the load from the rear portion of the bed, and hence there is no possibility of a load condition being established which might tend to tilt the front end of the wagon upwardly around the transverse pivot axis of the endless tread units. When either pair of doors is dropped, the corresponding detent pawl 161 or 161' swings down to the position indicated approximately in dotted lines in Fig. 17. When the pawl is restored to operative position, its proper engagement in the teeth of the associated ratchet wheel is assured by the engagement of the stop projection 167 with a shoulder 171 on the bracket structure 166, whereby the pawl is caused to swing outwardly around the pivot 162 to a position substantially in prolongation of the short lever arm 163 or 163'. As each ratchet wheel is advanced in a door-lifting operation, the associated tripping lever 164, or 164' oscillates slightly on the pivot shaft 165 as the detent pawl drops behind successive teeth of the wheel, the projection 167 maintaining the lever and the pawl in substantially rigid relation during such oscillatory movement of the tripping lever. As previously remarked, the weight of the long outer arm of the lever normally holds the detent pawl in the teeth of the ratchet wheel.

In summarizing the advantages of our construction, it will be evident that the two axle brackets 67 constitute, in effect, an arched axle structure, with the upper part of the arch disposed in the horizontal plane of the main frame and, hence, not reducing the height of clearance below the wagon. Consequently, no difficulty is had in clearing the wagon from the dumped pile of material, such as would be the case if a straight through axle were extended between the two endless tread units 25. Attention is also directed to the fact that the tread units are so proportioned in length and are so related to the upwardly extending sides of the bed, that these tread units can turn completely over around the stub axles 66 without striking any part of the wagon. Hence, if the front end of one of these tread units should drop into a deep hole in the forward travel of the wagon, the tread unit can turn completely over in clearing itself from such hole. By dividing the bed into front and rear compartments, and providing separate pairs of doors for each compartment, the overall length of each door is reduced, each door is better supported to carry the weight of the load thereon, and the effort required to raise these comparatively short doors is greatly reduced. As previously remarked, the hollow intermediate partition 61 serves to reenforce the bed in the transverse plane of its support on the tread units, as well as to house the hoisting chains passing down to the adjacent ends of the doors.

The track laying units provide a relatively large suporting area and a small normal radius. The area which is provided by the units is ample to support a large load, such as can be carried by the body shown but the radius is so small that if the body were held no higher than the radius of the unit above the ground there would not be sufficient room under the body to dump the load. Also there would not be sufficient room to open the dumping doors. By the expedient of using the depending brackets and supporting the track laying units on said brackets below the horizontal plane of the frame, notwithstanding the short radius of the track laying units, the frame is supported high enough to permit opening of the doors and subsequent clearance of the dumped load by the body, axles and units, whereby a highly desirable construction is provided. The track laying units are of a minimum operating radius as in the position shown in Fig. 1, so small that if the frame and body rested upon a through axle, not sufficient room would be provided below the open end of the dump body to permit the body to clear the dumped load.

The bottom of the body lies high enough above the level of the ground and the track laying units are disposed laterally far enough to permit the contents of the body to be dumped into the space so provided without burying the track laying units or seriously blocking the same. The axle structure thus provides below it and between the track laying units sufficient space to permit the contents of the wagon to be dumped without seriously fouling the wagon. At the same time the outward and downward projection of the axle brackets puts the supports, i. e. the treads, out laterally far enough to secure an unusual degree of stability against lateral tipping of the wagon.

Having thus described our invention, what we claim is:—

1. A dump wagon comprising a frame having longitudinally extending frame bars, a bed supported by said frame, front and rear bottom dump doors for the front and rear portions of said bed, a pair of axle brackets secured to said frame bars between the adjacent edges of said front and rear dump doors, reenforcing means extending between said axle brackets, each of said brackets comprising a downwardly and outwardly extending arm, axles carried by said arms, and self-laying track units pivotally supported on said axles at opposite sides of the wagon.

2. A dump wagon comprising a frame having longitudinally extending side frame bars, a bed supported by said frame, front and rear bottom dump doors for the front and rear portions of said bed, axle brackets secured to the inner sides of said side frame bars in a transverse plane between the adjacent edges of said front and rear dump doors, a transverse reenforcing bar extending between said axle brackets, each of said axle brackets comprising a downwardly and outwardly inclined arm, axles carried by said arms, and self-laying track units rotatably supported on said axles at opposite sides of the wagon, said track units being capable of turning completely over around said axles in the travel of the wagon.

3. A dump wagon comprising a bed having bottom dump doors extending substantially from end to end of the bed, a transverse partition in said bed intermediate the ends thereof, stub axles, axle brackets for said stub axles secured to the bed substantially in the transverse plane of said partition, endless tread units rotatably supported on said stub axles at opposite sides of the wagon, and mechanism for closing said dump doors comprising flexible hoisting members extending down to said doors through said transverse partition, said units being of a normal operating radius of less than the space required for dumping the load, said brackets extending upwardly and inwardly to form with the bed a transverse arch extending substantially clear of the pile of material dumped from a substantially full bed.

4. A dump wagon comprising a bed having front and rear bottom dump doors adjacent to the front and rear ends of the bed, a transverse partition in said bed in a plane between the adjacent ends of said front and rear doors, bracket means secured to said bed substantially in the plane of said partition and comprising outwardly projecting stub axles, endless tread units pivotally supported on said axles at opposite sides of the wagon, and mechanism for raising said dump doors to closed position comprising hoisting chains extending down through said transverse partition to the doors, said brackets and the frame forming a transverse arch to substantially clear the material dumped from a substantially full bed.

5. A dump wagon comprising a frame, a bed supported thereby, an arched axle structure extending transversely between the sides of said frame intermediate the ends of said bed, said arched axle structure comprising outwardly extending stub axles, endless tread units pivotally supported on said axles at opposite sides of the wagon, dump doors in the bottom of said bed extending forwardly and rearwardly from said arched axle structure, and mechanism for raising said doors to closed position comprising flexible members engaging with said doors adjacent to said arched axle structure and adjacent to the front and rear ends of said bed.

6. A dump wagon comprising a bed having side walls, dump doors closing the bottom of said bed, channel guides extending along said side walls adjacent to the upper edges thereof, and mechanism for raising said doors to closed position comprising a flexible hoisting member extending through one of said channel guides and operatively connected with said doors.

7. A dump wagon comprising a bed having side plates, dump doors for closing the bottom of said bed, the upper edges of said side plates being bent outwardly and downwardly to form longitudinally extending channel areas adjacent to the upper edges of the bed, and mechanism for raising said doors to closed position comprising a flexible hoisting member extending through one of said channel areas and operatively connected with said doors.

8. A dump wagon comprising a bed having side plates, dump doors for closing the bottom of said bed, reenforcing bars of substantially Z-shaped cross-section secured to the upper margins of said side plates on the outer sides thereof, said reenforcing bars defining longitudinally extending channel areas on the outer sides of said side plates, and mechanism for raising said doors to closed position comprising a flexible hoisting member extending longitudinally through one of said channel areas and operatively connected with said doors.

9. A dump wagon comprising a load carrying bed, a frame therefor comprising a transversely extending arched axle structure intermediate the ends of said frame, longitudinally extending dump doors closing the bottom of said bed forwardly and rearwardly of said arched axle structure, stub axles on said arched axle structure projecting outwardly beyond the sides of said frame, and endless tread units pivotally supported on said stub axles for relative rocking movement, said transversely extending arched axle structure supporting the bed substantially clear of the load dumped by a substantially full bed.

10. A dump wagon comprising a frame, a load carrying bed supported thereon, the intermediate portion of said frame comprising a transversely extending axle supporting structure arched upwardly at its center to clear the dumped load, pairs of bottom dump doors disposed forwardly and rearwardly of said axle supporting structure and hinged at the sides of said bed for swinging outwardly and downwardly to the sides of the dumped load, stub axles carried by said axle supporting structure, and endless tread units pivotally supported on said stub axles for relative rocking movement, said stub axles projecting outwardly beyond the sides of said frame and being disposed to permit said endless tread units to turn completely over around said axles in the travel of the wagon.

11. A dump wagon comprising a frame, a bed supported thereon, bottom dump doors hinged at the sides of said bed for swinging outwardly and downwardly to the sides of the dumped load, a pair of axle brackets secured to said frame intermediate the ends thereof, reinforcing means extending between said axle brackets, each of said brackets comprising a downwardly and outwardly extending arm, axles carried by said arms, and self-laying track units pivotally supported on said axles at opposite sides of the wagon, the axle brackets and their reinforcing means being arched to substantially clear the load dumped from a substantially full bed.

12. A dump wagon comprising a frame, a bed supported thereby, an arched axle structure extending transversely between the sides of said frame intermediate the ends of said bed, a transverse partition in said bed above said arched axle structure, said arched axle structure comprising outwardly extending stub axles, endless tread units pivotally supported on said axles at opposite sides of the wagon, dump doors in the bottom of said bed extending forwardly and rearwardly from said arched axle structure, and mechanism for raising said doors to closed position comprising flexible members engaging with the inner ends of said doors adjacent to said arched axle structure and engaging with the outer ends of said doors adjacent to the front and rear ends of said bed, the portions of said flexible members which engage with the inner ends of said doors extending down through said transverse partition to the doors, said arched axle structure extending substantially clear of a full load when dumped.

13. A dump wagon comprising a frame, an arched axle structure extending transversely of said frame intermediate the ends thereof, stub axles carried on said arched axle structure, endless tread supporting units pivoted on said stub axles for rocking movement relatively to said frame, a bed supported on said frame having side walls, dump doors closing the bottom of said bed, a channel guide extending along one of said side walls adjacent to the upper edge thereof, and mechanism for raising said doors to closed position comprising a flexible hoisting member extending through said channel guide and operatively connected with one of said doors.

14. A dump wagon comprising a frame, a load carrying bed supported thereon, bottom dump doors hinged to said frame along the sides of said bed for swinging outwardly and downwardly to the sides of the dumped load, a pair of axle brackets secured to said frame intermediate the ends thereof, stub axles carried by said brackets, said brackets comprising axle supporting arms extending outwardly and downwardly from said frame to support said stub axles below said frame and projecting outwardly from the sides thereof, said axle brackets and the bottom of the frame defining an arch extending substantially clear of a substantially full load dumped from the bed, and endless tread units pivotally supported on said stub axles for rocking movement relatively to said frame.

15. A dump wagon comprising a frame having side frame bars, a load carrying bed supported thereon, bottom dump doors hinged to said frame along the sides of said bed for swinging outwardly and downwardly to the sides of the dumped load, a pair of axle brackets secured to said frame intermediate the ends thereof, stub axles carried by said brackets, said brackets comprising axle supporting arms extending outwardly and downwardly from said frame to support said stub axles below said frame and projecting outwardly from the sides thereof, reenforcing means extending between the side bars of said frame substantially in the transverse plane of said axle brackets, the reinforcing means between the axle brackets lying in substantially the horizontal plane of the side frame bars, and endless tread units pivotally supported on said stub axles for rocking movement relatively to said frame.

16. In a dump wagon, an oblong main frame comprising side members and a rear cross member, a hopper body having an open bottom mounted in the frame, said body having a rear wall spaced from said cross member, the sides of the body comprising outwardly extending flanges at the upper edges providing longitudinal housings, chains in said housings, a pair of doors hinged at the sides of the frame and terminating at the rear of the body, a vertical frame member secured to the rear cross member and having its upper end connected to the upper edge of the body, and sheaves at the rear end of the body over which said chains are trained to the rear ends of said doors, said chains extending between the vertical frame member and the rear wall of the body.

17. In a dump wagon, a substantially rectangular frame, a hopper body held in the frame and having an open bottom substantially flush with the bottom of the frame, doors hinged on the frame for closing said open bottom, track laying ground engaging units at the sides of the frame, and an axle member connecting the units with the frame and comprising depending members and a central portion carried above said doors, whereby the frame clears substantially a full load discharged from the body.

18. In a dump wagon, an oblong frame, a hopper body held in the frame and having an open bottom substantially flush with the bottom of the frame, doors for said open bottom, track laying ground engaging units at the sides of the frame, axle brackets connected to the sides of the frame and extending down outside the frame, stub axles for the units lying outside the frame, and a brace within the frame for taking the stress of said brackets upon the frame, said brace lying between the sides of the frame.

19. In a dump wagon, a substantially rectangular frame, a load carrying bed supported thereon and having bottom dumping doors for dumping the load, hinged along the sides of the frame for swinging outwardly and downwardly to the sides of the dumped load, track laying ground engaging units at the sides of the frame, and brackets connecting the units with the frame and supporting the frame in elevated position to permit opening of the doors and to substantially clear the frame of a substantially full load dumped from the bed, said brackets clearing substantially a full load discharged from the body.

20. In a dump wagon, a substantially rectangular frame, a load carrying bed supported thereon and having bottom dumping doors extending substantially the width of the bottom of the body for dumping the load, hinged along the sides of the frame for swinging outwardly and downwardly to the sides of the dumped load, track laying ground engaging units at the sides of the frame, and brackets connecting the units with the frame and supporting the frame in elevated position to permit the doors to be opened and to let the load be dumped out of the bed, said units being of a normal radius less than the width of a single one of said doors, said brackets supporting the frame in elevated position to clear the doors from the ground when opened.

21. In a dump wagon, the combination of a substantially rectangular frame, a load carrying bed supported thereon and having bottom dumping doors for dumping the load, hinged to the sides of the frame for swinging outwardly and downwardly to the sides of the dumped load, brackets depending at opposite sides of the frame and carrying stub axles at their lower ends, track laying ground engaging units at the opposite sides of the frame and journaled on said stub axles for relatively rocking movement, said brackets and frame forming substantially a transverse arch extending over the pile of material when dumped at a height to clear a substantially full load.

22. In a dump wagon, the combination of a frame, a load carrying bed supported thereon and having bottom dumping doors for dumping the load, brackets depending at the opposite sides of the frame and secured thereto, track laying ground engaging units mounted on said brackets below the horizontal plane of the frame, said brackets and frame forming substantially a transverse arch extending over the pile of material when dumped at a height to clear a substantially full load.

23. In a dump wagon, a frame, a load carrying bed supported thereon and having a bottom dumping door for dumping the load, hinged to the frame and swingable downwardly, track laying ground engaging units at the sides of the frame, and means mounting the frame upon said units and supporting the frame in elevated position to permit opening the door and to substantially clear the frame of a substantially full load dumped from the bed, said mounting means clearing substantially a full load discharge from the body.

In witness whereof, we hereunto subscribe our names this 14th day of April, 1928.

JAMES D. BENBOW.
JAMES B. GREEN.